(12) United States Patent
Hahn et al.

(10) Patent No.: US 7,490,317 B1
(45) Date of Patent: Feb. 10, 2009

(54) METHODS AND APPARATUS FOR REPRESENTING APPLICATION DEPENDENCIES

(75) Inventors: Stephen C. Hahn, Redwood City, CA (US); Liane Praza, Redwood City, CA (US); Michael W. Shapiro, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 877 days.

(21) Appl. No.: 10/938,856

(22) Filed: Sep. 9, 2004

(51) Int. Cl.
*G06F 9/44* (2006.01)
*G06F 9/45* (2006.01)

(52) U.S. Cl. .................. 717/121; 717/120; 717/144; 717/156

(58) Field of Classification Search .................. None
See application file for complete search history.

(56) References Cited

U.S. PATENT DOCUMENTS 7,197,561 B1 * 3/2007 Lovy et al. .................. 709/224
7,296,194 B1 * 11/2007 Lovy et al. .................. 714/57

OTHER PUBLICATIONS

Kon et al., "Dependence Management in Component-Based Distributed Systems", Jan. 2000, IEEE, pp. 1-11.*
Vieira et al., "Describing Dependencies in Component Access Points", CBSE (Component-Based Software Engineering), May 2001, pp. 1-4.*
Keller, A. and Kar, G., "Dynamic Dependencies in Application Service Management", PDPTA 2000, Jun. 2000, 7 pages.
Hunt, J., "Boot Linux Faster", Sep. 17, 2003, http://www-128.ibm.com/developerworks/library/1-boot.html downloaded from Internet Feb. 8, 2006, 10 pages.
Sanchez, W. and Vechten, K., "SystemStarter and the Mac OS X Startup Process", published in the Proceedings of the BSDCon '02 Conference on File and Storage Technologies, Feb. 2002, Last changed: Dec. 28, 2001, http://www.usenix.org/events/bsdcon02/full_papers/sanchez-html downloaded from Internet Feb. 8, 2006, 9 pages.
"Novell Documentation: ZENworks 7—Section 37.0 Advanced Distribution: Configuring Application Dependencies and Chains", http://www.novell.com/documentation/zenworks7/dm7admin/data/aflms6k.html downloaded from Internet Feb. 8, 2006, 1 page.

* cited by examiner

*Primary Examiner*—Eric B Kiss
*Assistant Examiner*—Ben C Wang
(74) *Attorney, Agent, or Firm*—Osha • Liang LLP (57) ABSTRACT

Methods and apparatus for representing application dependencies are disclosed. A software application is executed according to an associated state machine. A set of dependencies relationship rules indicates dependencies of a set of software applications upon the software application based upon the state of the software application. The set of dependencies relationship rules may be represented by a dependencies graph, where the software application and the set of software applications are each represented by a dependency node in the dependencies graph and each line connecting the software application with one of the set of software applications corresponds to one or more dependency statements indicating a change in state in one of the set of software applications in response to a change in state of the software application.

59 Claims, 7 Drawing Sheets

METHODS AND APPARATUS FOR REPRESENTING APPLICATION DEPENDENCIES

BACKGROUND

When applications are entirely independent from one another, the modification, reconfiguration or other change in state of one application does not affect the ability to execute another independent application. For instance, some applications may have no required facilities in common, and therefore may be immune to the other executing application's failure.

Commonly, application dependencies exist in various forms. For instance, a reconfiguration of one application may affect another application that exchanges information with the reconfigured application or that includes a call to the reconfigured application. As another example, the failure of an application may affect the ability of a calling application to complete its execution. Thus, application dependencies may take a variety of forms such that the failure, modification or reconfiguration of one application affects the ability to execute another dependent application. As a result, it is often necessary to restart the applications that are dependent upon a failed, modified, or reconfigured application in order to achieve system functionality. Of course, the restarting of the dependent applications may further require restarting other applications that are dependent upon the newly restarted applications. Accordingly, application dependencies can be complex.

SUMMARY

The described embodiments include methods and apparatus for representing application dependencies. This is accomplished, in part, through configuration of one or more dependencies relationship rules specifying a dependency relationship between two or more software applications. The dependencies rules may be represented in a variety of forms, including but not limited to, a dependencies graph. In this manner, the existence and type of complex dependency relationships among software applications may be represented in an accurate manner.

In accordance with one aspect of the invention, a set of dependencies relationship rules describing a set of dependency relationships are established. Each dependencies relationship rule indicates a dependency of one or more software applications on the state of another software application. In other words, a specified state change in one or more software applications may be initiated in response to a change in state of another software application. In addition, each software application has an associated state machine including a plurality of states and transitions between the plurality of states. Exemplary application states include, but are not limited to, UNINITIALIZED, OFFLINE, ONLINE, DISABLED, DEGRADED, or MAINTENANCE.

Each dependency relationship rule may be complex and may therefore define a relationship among multiple applications. Therefore, a dependency relationship rule may be defined through the use of a plurality of dependency statements that each define a one-to-one relationship between two software applications. The dependency relationship rules and statements may be executed in parallel or hierarchically.

In accordance with another aspect of the invention, the set of dependencies relationship rules are represented by a dependencies graph. Each application or service is represented by a node in the dependencies graph and a dependency rule or statement is represented by a line connecting two of the nodes. In this manner, dependencies or error flows between applications or associated "services" may be represented. It is important to note that an application may be a software application that includes one or more software modules that performs a particular service or function (e.g., network configuration). Alternatively, an application may refer to a device state (e.g., network configuration). Moreover, a service may be defined as an aggregated set of modules that together define a capability on the system. As described above, each software application has an associated state machine, which may also be represented in the dependencies graph.

The dependencies graph may be navigated via a navigation mechanism that executes the dependency relationship rules, as appropriate. Thus, a change in state of one application may be initiated upon detection of a change in state of another application. The navigation mechanism may be referred to as a restarter, which may be restarted by the operating system. A change in state may be monitored and/or initiated by a state machine navigation mechanism. The state machine navigation mechanism may be implemented, for example, by a module dedicated to a particular software application.

In accordance with one embodiment, a restarter is dedicated to each software application. As the navigation mechanism executes the dependencies rules (or dependencies graph), the appropriate restarters are triggered in the order designated by the dependencies rules. Each restarter is therefore configured to restart its associated software application. In addition, the restarter is responsible for navigating its associated state machine. Thus, upon restart of the software application, the restarter may initiate the appropriate state changes as specified in the software application's state machine when the software application does not initiate its own state change. In accordance with alternate embodiments, a restarter may be associated with or responsible for one or more software applications.

In accordance with yet another aspect of the invention, state information is maintained. Specifically, the current location within the dependencies graph is tracked, as well as the current state of each of the software applications. The location within the dependencies graph may be stored in association with the navigation mechanism, while the state of each software application may be stored in association with the state machine navigation mechanism or restarter.

Embodiments of the invention may be implemented in software, hardware, or a combination of hardware and software. Embodiments of the invention can also be embodied as computer readable code on a computer readable medium. In addition, embodiments of the invention may also include data structures.

DETAILED DESCRIPTION

In the following description for embodiments of the invention, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Generally, an application may be dependent on one or more other applications. For instance, an application may include a subroutine call, system call, trap, or remote procedure call to one or more applications. If one of these subroutines fails, the application may be unable to continue executing. Generally, the failed subroutine may be restarted after any necessary hardware or software fixes. Any application that calls the failed subroutine may then be restarted to ensure proper execution.

Figure 1:
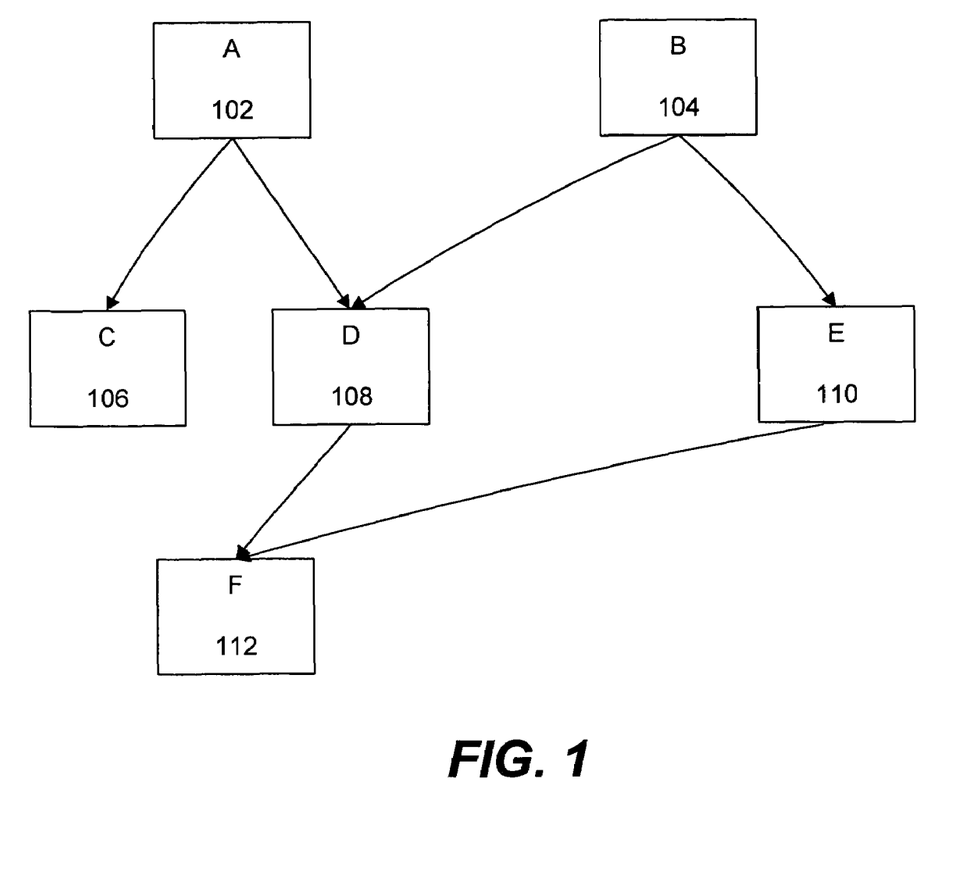
FIG. 1 is an exemplary simplified diagram representing application dependencies in accordance with one embodiment of the invention.

FIG. 1 is an exemplary simplified diagram representing application dependencies in accordance with one embodiment of the invention. As shown in FIG. 1, application A 102 calls applications C 106 and D 108, and is therefore dependent upon applications C 106 and D 108. Application B 104 calls applications D 108 and E 110, and is therefore dependent upon applications D 108 and E 110. Applications D 108 and E 110 require application F 112 for the startup of applications D 108 and E 110, and are therefore dependent upon application F 112. Each of the software applications may be implemented on the same machine, such as a web server. Alternatively, the software applications may be distributed among multiple, different machines.

While the mere existence of application dependencies are clear from this example, it is unclear to what extent each of the applications is dependent upon the called applications, as shown. For instance, a dependency may involve a subroutine or program call as set forth above with reference to applications A, B, and C, or merely require a particular subroutine or program for its initialization or startup as set forth above with reference to applications D and E. Such relationships are generally not shown in a hierarchical graph such as that shown in FIG. 1.

In accordance with one aspect of the invention, a dependency relationship may be expressed by one or more dependencies relationship rules. Specifically, a dependency relationship rule expresses a dependency relationship between two or more software applications. In other words, each of the dependencies relationship rules indicates a dependency of one or more software applications on the state of one or more software applications. Stated another way, a dependency rule may specify a change in state of one or more applications in response to a specified state change in another application. For instance, a dependency relationship rule may require that an application A restart when an application B is restarted or reconfigured. As another example, a dependency relationship rule may require that an application B restart when application A is restarted or when A fails and that application B end when application A ends. Thus, a single dependency relationship rule may be implemented by one or more dependency statements, where each dependency statement indicates a particular dependency relationship between two applications.

A dependency statement may be used to indicate a dependency of one of a set of software applications on the state of another software application. In other words, a dependency statement may specify a change in state of one application in response to a change in state of another application. Specifically, a dependency statement may be used to express a dependency of a software application on the state of another software application. For instance, the detected and/or initiated state of a software application may be "UNINITIALIZED," "OFFLINE," "ONLINE," "DISABLED," "DEGRADED," or "MAINTENANCE." As one example, one software application may be restarted in response to a failure of another software application. In addition, a dependency rule comprising one or more dependency statements may include operators. As one example, it may be desirable to specify that one software application does NOT need to be restarted in response to a failure of another software application.

Figure 2:
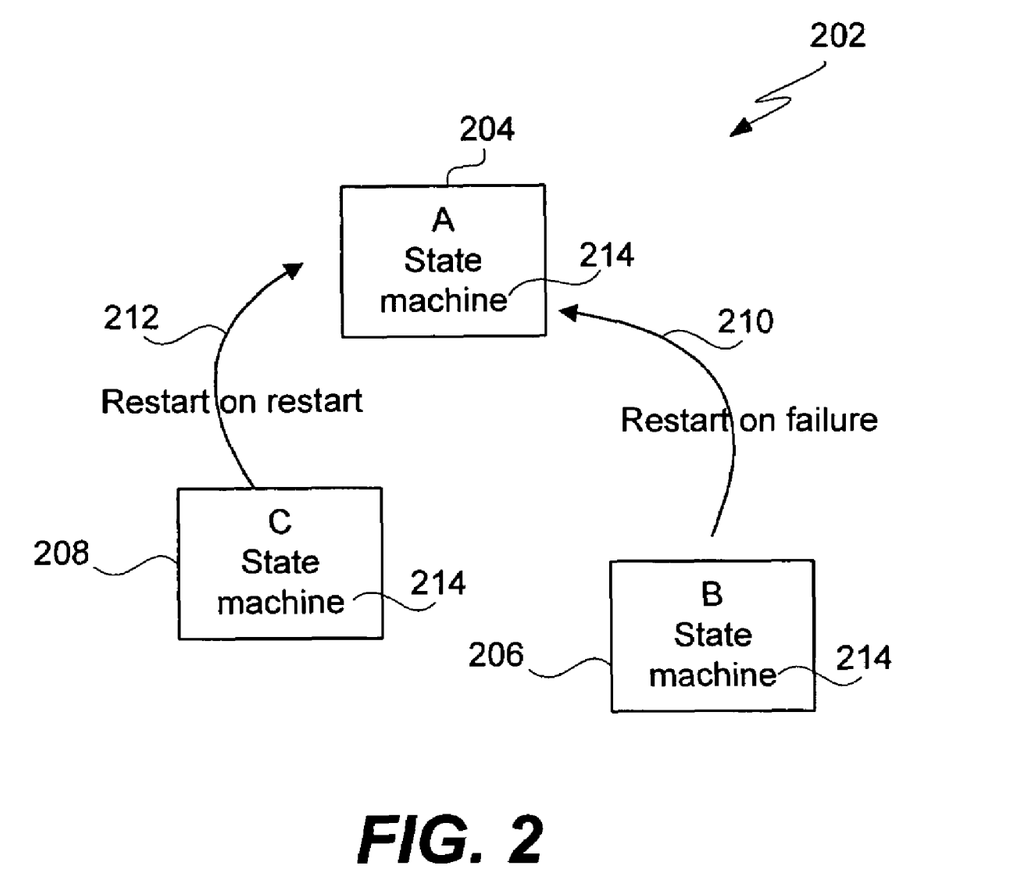
FIG. 2 is an exemplary dependencies graph in accordance with one embodiment of the invention.

In accordance with one embodiment of the invention, the application of a plurality of dependency relationship rules is implemented in the form of a dependencies graph. FIG. 2 is an exemplary dependencies graph in accordance with one embodiment of the invention. As shown in FIG. 2, a plurality of relationship rules are represented by a dependencies graph 202, where each software application A, B, and C is represented by a dependency node 204, 206, and 208, respectively, in the dependencies graph 202 and each line 210, 212 connecting a dependency node with one or more dependency nodes corresponds to one or more dependency rules or dependency statements, as shown. The dependencies graph may also further include a state machine 214 or representation of the state machine associated with each dependency node. As described above, the software applications or nodes in the dependencies graph 202 may be implemented on the same machine or may be distributed among multiple, different machines. Accordingly, a dependencies graph and the nodes therein may span a single machine or multiple machines.

Figure 3:
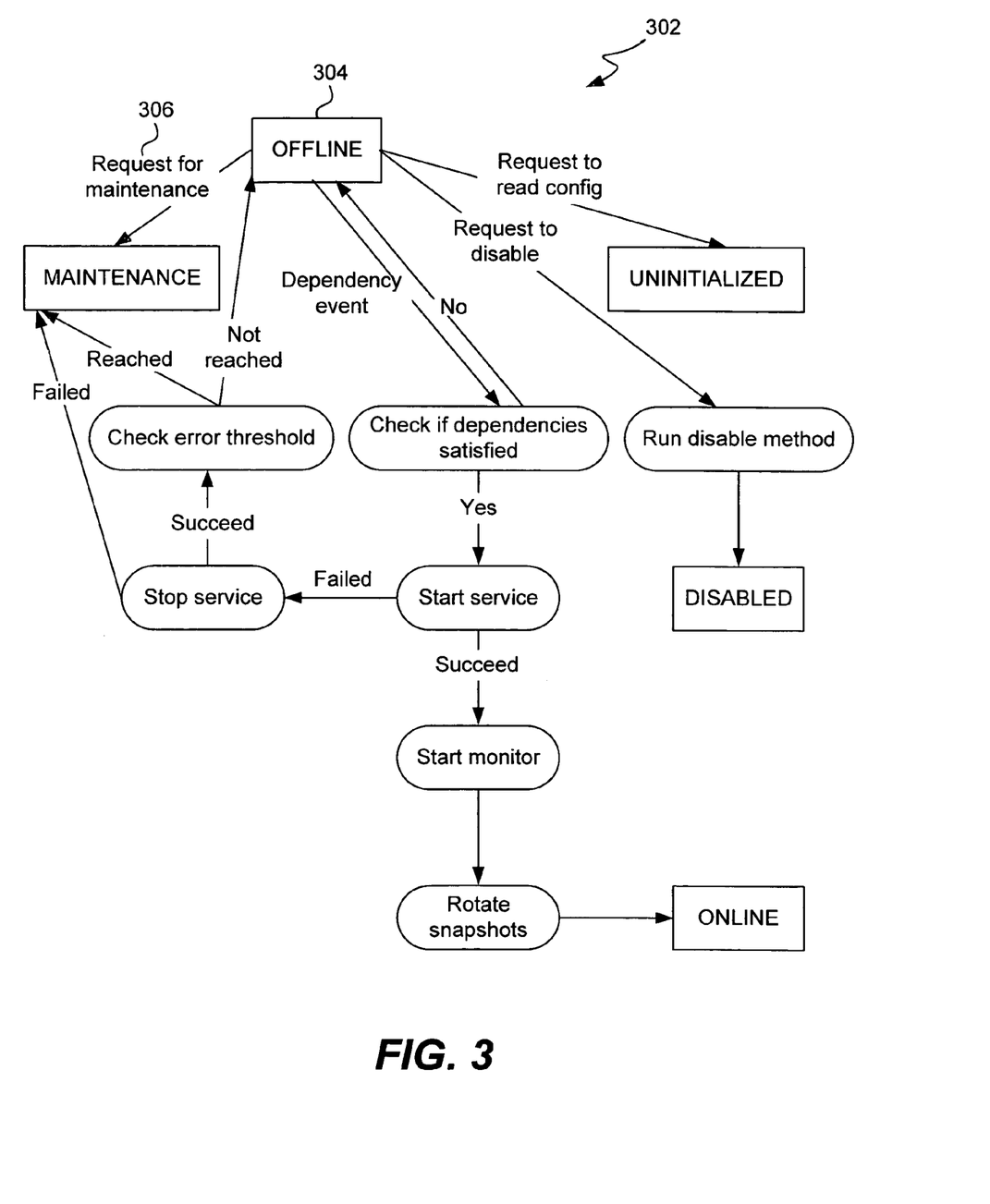
FIG. 3 is an exemplary state machine diagram associated with an application in accordance with one embodiment of the invention.

State machine diagrams are often used to represent a plurality of states and transitions between those states. FIG. 3 is an exemplary state machine diagram 302 associated with an application in accordance with one embodiment of the invention. As shown, each node 304 represents a potential state of the associated application and each line 306 represents a transition (e.g., via one or more steps) between two states. In this example, potential states include UNINITIALIZED, OFFLINE, ONLINE, DISABLED, DEGRADED, or MAINTENANCE.

In accordance with one embodiment, each of the plurality of software applications has an associated state machine defining a plurality of states and transitions among the plurality of states. As set forth above, a dependency node in a dependencies graph may be used to represent a software application. In addition, a dependency node may be used to further represent a state machine associated with a particular software application. In other words, the dependencies graph may be used to represent multiple software applications, the dependency relationships among those software applications, and the state machines associated with those software applications.

Figure 4:
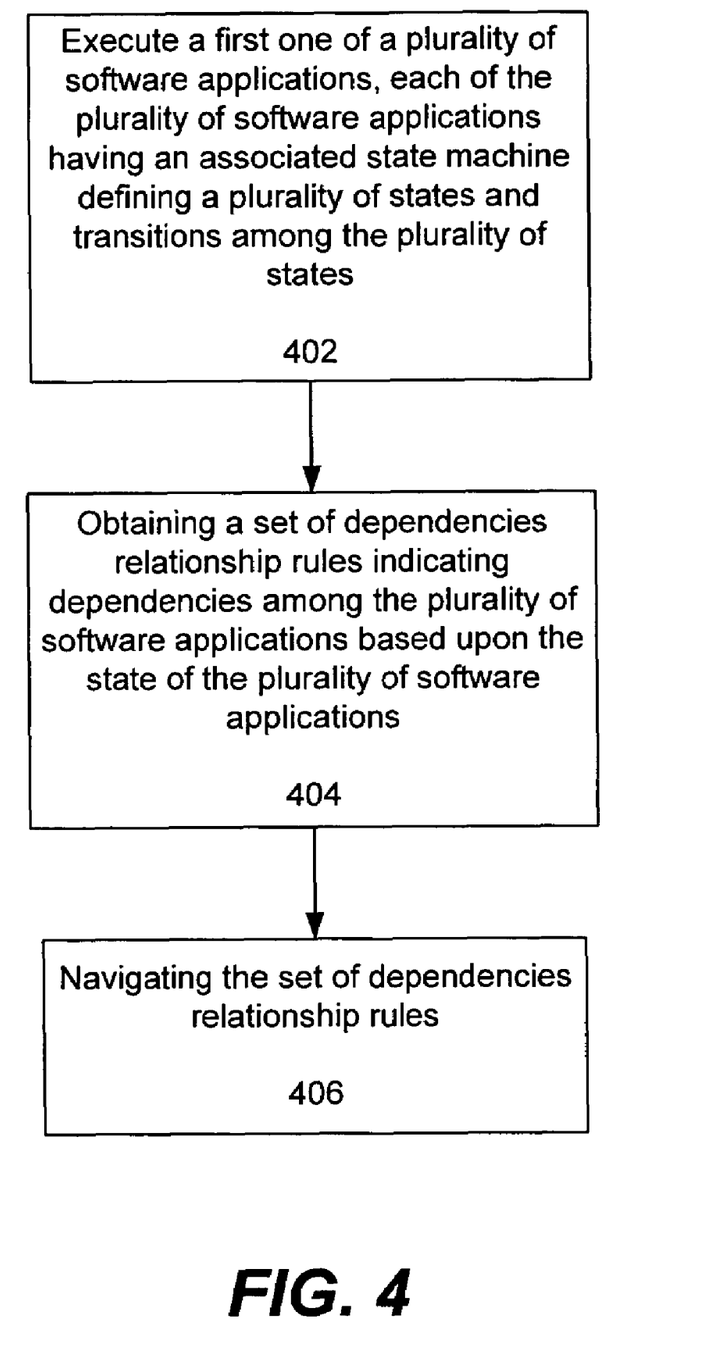
FIG. 4 is a process flow diagram illustrating a general method of representing application dependencies in accordance with one embodiment of the invention.

FIG. 4 is a process flow diagram illustrating a general method of representing application dependencies in accordance with one embodiment of the invention. As described above, a plurality of applications may have various dependency relationships among them. In addition, each of the plurality of software applications has an associated state machine defining a plurality of states and transitions among the plurality of states. As shown in FIG. 4, a first one of the plurality of software applications is executed at block 402 according to an associated state machine. A set of dependencies relationship rules indicating dependencies among the plurality of software applications based upon the state of the plurality of software applications is then obtained at block 404. More particularly, the set of dependencies rules includes a set of zero or more of the plurality of software applications that depend upon the first software application based upon the state of the first software application in accordance with the set of dependencies rules. The set of dependencies relationship rules are then "navigated" or executed as appropriate at block 406.

Navigation or execution of the dependencies rules or dependencies graph may include detecting a change in state of the software application being executed using its associated state machine and performing the action specified by dependencies relationship rules with respect to the software applications that depend upon the application being executed. For instance, the action may be to initiate a change in state of one or more software applications. In addition, navigation of the dependencies rules or dependencies graph may require maintaining state information associated with the dependencies graph and the state machines associated with the set of software applications. For instance, a tracking mechanism may identify and store information indicating the node or nodes that are executing, as well as the state of those nodes.

The dependencies rules may be represented and stored in a variety of formats, including but not limited to, tables, arrays, and linked lists. Generally, executing or navigating the dependencies relationship rules will result in execution of other ones of the plurality of software applications and their associated dependencies relationship rules. This may be performed through a process such as an iterative or recursive process by "traversing" the dependencies relationship rules (or dependencies graph).

Each of the set of dependencies relationship rules may be used to indicate a nature and/or degree of the relationship between two or more different software applications (e.g., the software application being executed and another software application). For instance, a dependency relationship rule may indicate that there is no dependency relationship or that there is a dependency relationship. In addition to indicating that there is a dependency relationship between two software applications, the dependency relationship rule may indicate the type or significance of the dependency. This may be accomplished through the use of rules such as IF application A state is X THEN perform dependency action Y with respect to application B or IF THEN ELSE statements, or merely through the use of tags or numerical values to indicate a particular dependency action to be performed, if any.

Each of the dependencies rules may define or indicate a dependency action that will be performed as the dependency rule is executed. For instance, a dependency rule may specify that when application A is restarted, application B needs to be restarted. Thus, navigation of the dependencies rules may be performed such that at least one dependency action is executed in accordance with the set of dependencies relationship rules. For instance, the dependency action may be refresh, disable and/or restart. Accordingly, navigation of the dependencies rules may result in the refresh, disable and/or restart of one or more of the software applications.

Figure 5:
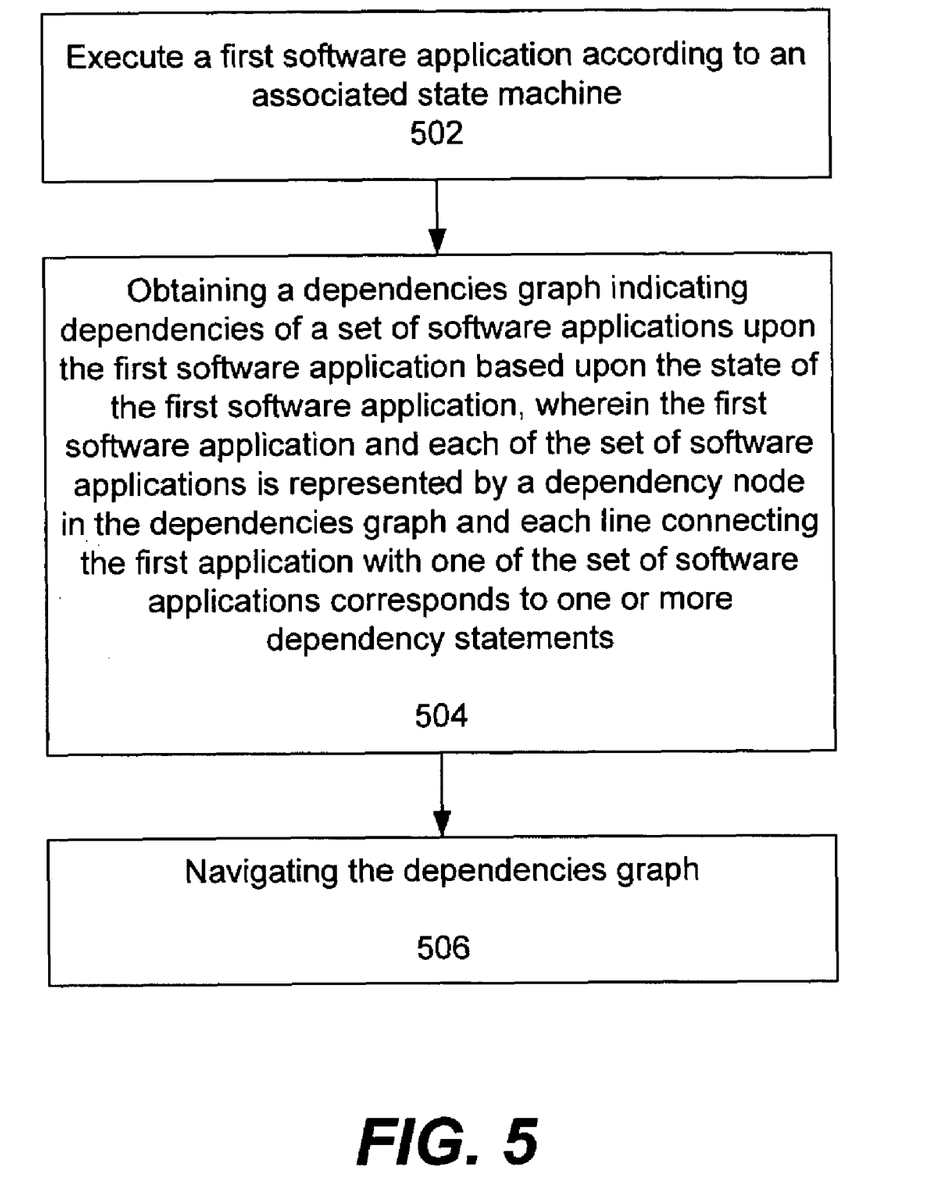
FIG. 5 is a process flow diagram illustrating a specific method of representing application dependencies in accordance with one embodiment of the invention.

FIG. 5 is a process flow diagram illustrating a specific method of representing application dependencies in accordance with one embodiment of the invention. In this embodiment, a dependencies graph is traversed. As shown at block 502, a first software application is executed according to an associated state machine. A dependencies graph is then obtained at block 504. The dependencies graph may be represented in a variety of formats, such as through linked lists, tables, arrays or other suitable data structures. As described above with reference to FIG. 2, the dependencies graph indicates dependencies among the software applications. More specifically, the dependencies graph indicates dependencies of a set of zero or more software applications upon the first software application based upon the state of the first software application, wherein the first software application and each of the set of software applications is represented by a dependency node in the dependencies graph and each line connecting the node representing the first application with a node representing one of the set of software applications corresponds to one or more dependency statements that may be used to implement a particular dependency rule. For instance, multiple dependency actions may be performed as specified by multiple dependency statements. Moreover, dependency actions may be performed with respect to multiple applications. In addition, each dependency node may further represent the state machine associated with the corresponding software application. The dependencies graph is then navigated at block 506.

Navigation of the dependencies graph may involve initiating a change in state of one or more applications represented by one or more of the dependency nodes in the dependencies graph in accordance with the corresponding dependency statements. For instance, a change in state may include, but is not limited to, restarting, stopping, starting, or halting a software application. Each of the dependency rules or dependency statements may also indicate an order in which the state change is to be initiated in multiple software applications. As one example, if multiple software applications are to be restarted, the corresponding dependency rules or dependency statements may indicate an order in which the software applications are to be restarted in response to a detection of a particular change in state of another software application. As set forth above, this detected change in state may include, but is not limited to, UNINITIALIZED, OFFLINE, ONLINE, DISABLED, DEGRADED, or MAINTENANCE. It is also possible that a dependency rule or statement may indicate that a change in state does not need to be initiated when a particular change in state occurs with respect to another application. For instance, a dependency rule may indicate that a software application does not need to be restarted upon failure of another software application, such as when it merely needs the software application in order to boot up or initialize.

Figure 6:
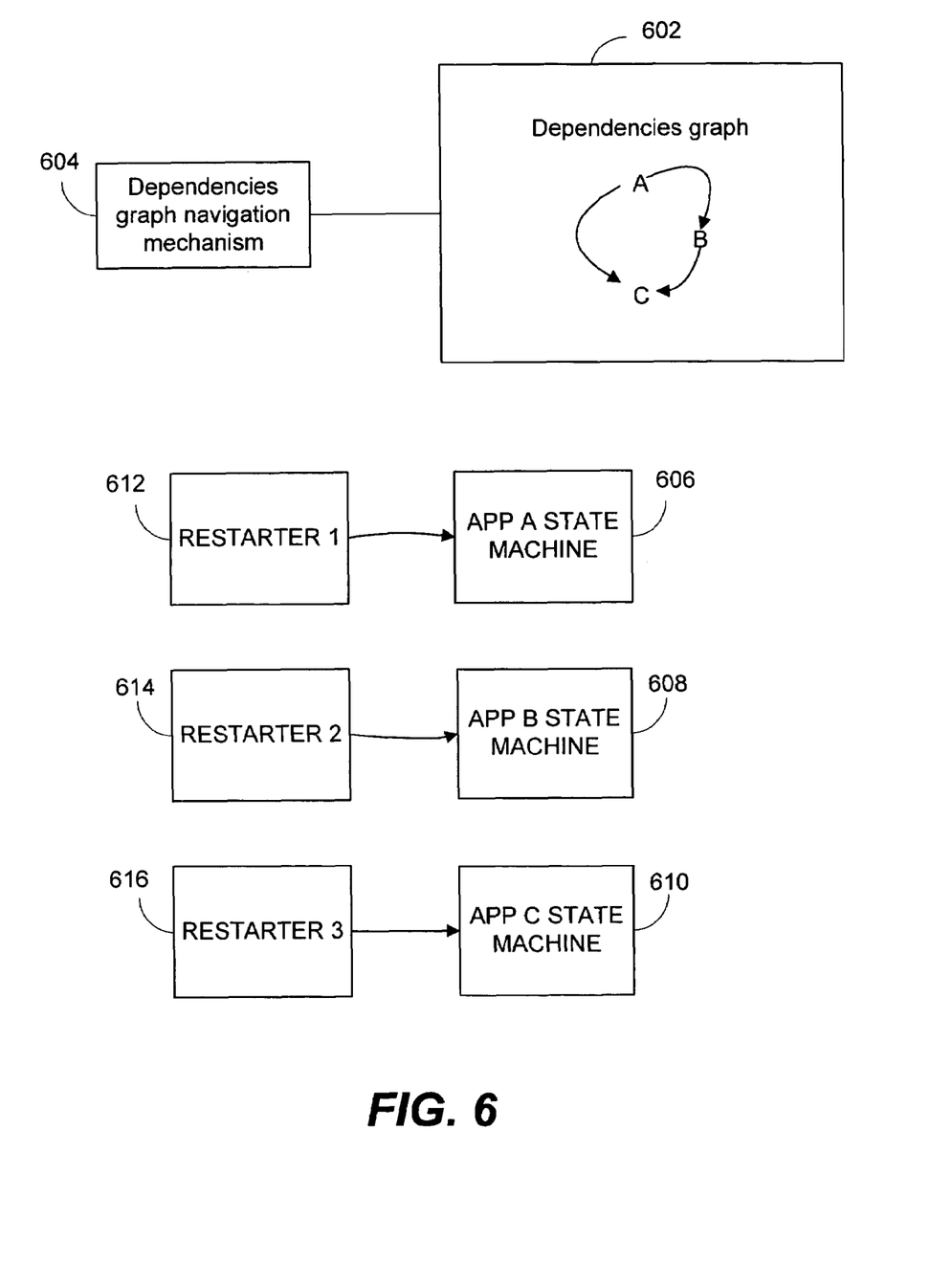
FIG. 6 is a block diagram illustrating a system in which embodiments of the invention may be implemented.

FIG. 6 is a block diagram illustrating a system in which embodiments of the invention may be implemented. As set forth above, dependencies among multiple software applications may be expressed by dependencies rules, which may be implemented in the form of a dependencies graph 602. In order to navigate a set of dependencies rules, a mechanism for navigating the dependencies rules or dependencies graph 604 is implemented. In one embodiment, the mechanism for navigating the dependencies graph comprises a graph navigation mechanism or restarter adapted for navigating the dependencies graph and a plurality of state machine navigation mechanisms, where each of the state machine navigation mechanisms is configured to navigate the corresponding state machine associated with one of the plurality of software applications. Specifically, the system may include a mechanism for detecting a state change (e.g., within an associated state machine) in one or more software applications, as well as a mechanism for initiating a change in state (e.g., restarting) in one or more software applications. A variety of system configurations are possible to achieve this functionality.

In this example, each state machine associated with a software application is managed by a separate module such as a state machine navigation mechanism. For instance, a state machine navigation mechanism may comprise a restarter. Specifically, software application A's state machine 606, software application B's state machine 608, and software application C's state machine 610 are managed by associated restarters 612, 614, and 616, respectively. In an alternative embodiment, a single module or restarter manages multiple software applications.

A dependency rule may indicate an order in which a state change should be performed or initiated in multiple software applications in response to a state change in another software application. In accordance with one embodiment, a plurality of restarters are related in a hierarchical manner. For instance, the graph navigation mechanism may initiate a restart process and each of the restarters may restart an associated software application in accordance with the corresponding state machine.

A restarter may be initiated in response to various circumstances, which may be defined by dependency relationship rules. Alternatively, a restarter may be configured to restart corresponding to various dependency relationship rules. For instance, as described above, it may be desirable to restart an application upon failure, restart, or reconfigure of another application. Alternatively, a first software application may not need to be restarted upon failure of another second software application, such as when the second application is needed merely to start or initialize the first software application.

Figure 7:
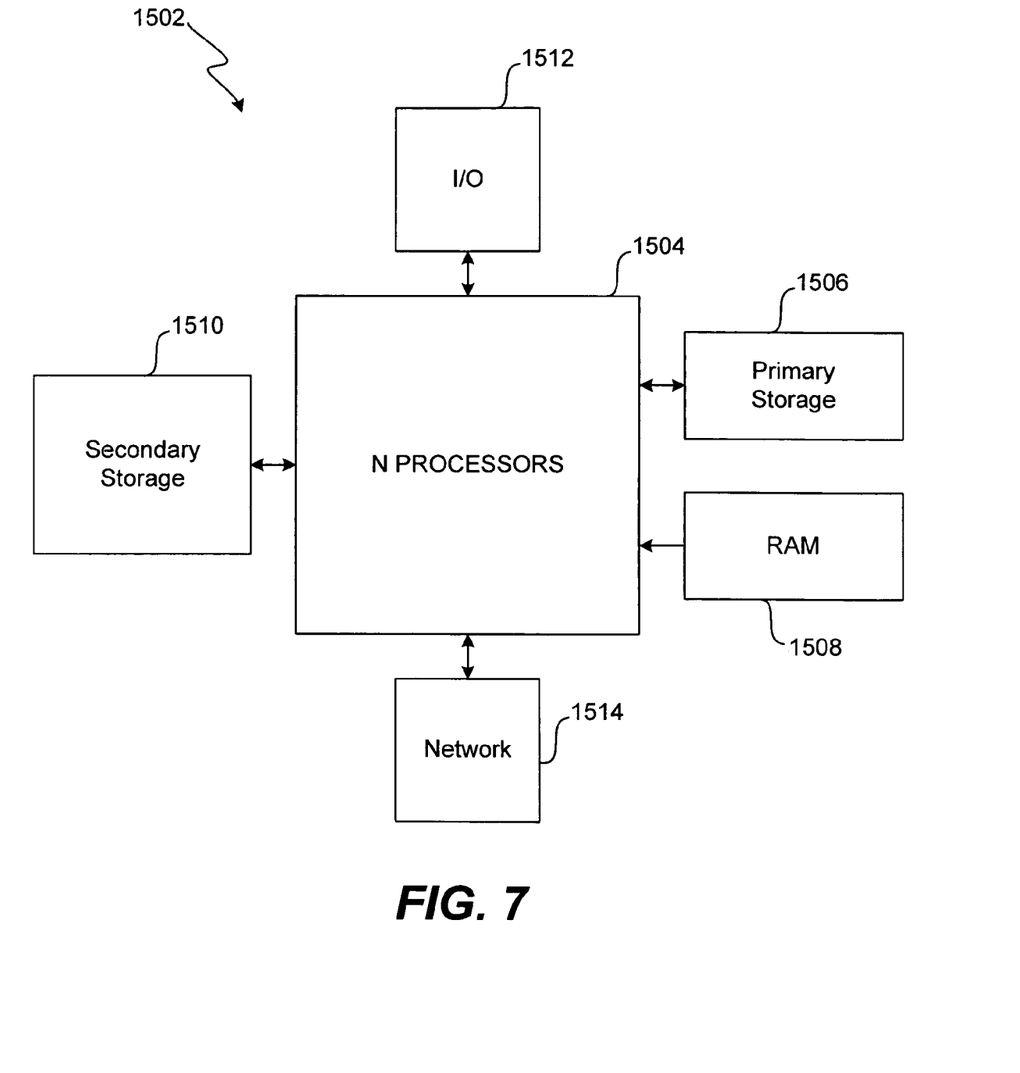
FIG. 7 is a block diagram illustrating a typical, general-purpose computer system suitable for implementing the present invention.

The present invention may be implemented on any suitable computer system. FIG. 7 illustrates a typical, general-purpose computer system 1502 suitable for implementing the present invention. The computer system may take any suitable form.

The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). Both the primary storage devices 1506, 1508 may include any suitable computer-readable media. The CPUs 1504 may generally include any number of processors.

A secondary storage 1510, which is typically a mass memory device, may also be coupled bi-directionally to CPUs 1504 and provides additional data storage capacity. The secondary storage 1510 is a computer-readable medium that may be used to store programs including computer code, data, and the like. Typically, the secondary storage 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and outputted to the network, for example, in the form of a computer data signal embodied in a carrier wave. It is contemplated that one or more of the elements of the computer system 1502 may be located remotely and accessed via a network.

Although illustrative embodiments and applications of this invention are shown and described herein, many variations and modifications are possible which remain within the concept, scope, and spirit of the invention, and these variations would become clear to those of ordinary skill in the art after perusal of this application. The described embodiments may be implemented with respect to a variety of systems and may therefore be implemented in other contexts with alternate data structures. Moreover, the above described process blocks are illustrative only. Therefore, the processes may be performed using alternate process blocks as well as alternate data structures. Moreover, the disclosed processes may be performed on the same or different computer systems. Accordingly, the present embodiments are to be considered as illustrative and not restrictive, and the invention is not to be limited to the details given herein, but may be modified within the scope and equivalents of the appended claims.

What is claimed is:

1. A method for representing application dependencies, comprising:

executing a first software application according to an associated state machine;

obtaining a set of dependencies relationship rules, the set of dependencies relationship rules indicating dependencies of a set of software applications upon the first software application based upon the state of the first software application; and navigating the set of dependencies relationship rules indicating dependencies of the set of software applications upon the first software application based upon the state of the first software application, wherein the set of dependencies relationship rules is represented by a dependencies graph, wherein the first software application and each of the set of software applications is represented by a dependency node in the dependencies graph and each line connecting the first software application with one of the set of software applications corresponds to one or more dependency statements, and wherein the dependencies graph spans multiple physical machines, wherein navigating the dependencies relationship rules comprises using a graph navigation mechanism adapted for navigating the dependencies graph, and using a plurality of state machine navigation mechanisms, each of the plurality of state machine navigation mechanisms being adapted for navigating the corresponding state machine associated with one of the set of software applications, and wherein the graph navigation mechanism and the plurality of state machine navigation mechanisms each comprise a plurality of restarters related in a hierarchical manner, wherein each of the restarters is adapted for restarting one of the set of software applications in accordance with the corresponding state machine.

2. The method as recited in claim 1, wherein one of the set of dependencies relationship rules indicates that a change in state in one or more of the set of software applications does not need to be initiated in response to a change in state of the first software application.

3. The method as recited in claim 2, wherein the change in state of the first application is specified by the dependency relationship rule.

4. The method as recited in claim 1, wherein one of the set of dependencies relationship rules indicates that a specified change in state in one or more of the set of software applications is to be initiated in response to a specified change in state of the first application.

5. The method as recited in claim 1, wherein navigating is performed such that one or more of the set of software applications is refreshed, disabled, or restarted in accordance with the corresponding one of the set of dependencies relationship rules.

6. The method as recited in claim 1, wherein navigating is performed such that at least one dependency action is executed in accordance with the set of dependencies relationship rules.

7. The method as recited in claim 6, wherein the dependency action is at least one of refresh, disable, and restart.

8. The method as recited in claim 1, wherein each of the dependency statements specifies a change in state of one of the set of software applications in response to a specified change in state of the first software application.

9. The method as recited in claim 1, further comprising:
detecting a change in state of the first software application; and
initiating a change in state of one or more of the dependency nodes in the dependencies graph in accordance with the corresponding one or more dependency statements.

10. The method as recited in claim 1, wherein each dependency node in the dependencies graph further represents the state machine associated with the corresponding software application.

11. A method for representing application dependencies, comprising:
executing a first one of a plurality of software applications, each of the plurality of software applications having an associated state machine defining a plurality of states and transitions among the plurality of states; and
navigating a set of dependencies relationship rules indicating dependencies among the plurality of software applications based upon the state of the plurality of software applications,
wherein the set of dependencies relationship rules are represented by a dependencies graph, wherein each of the plurality of software applications is represented by a dependency node in the dependencies graph and each line connecting two of the plurality of software applications corresponds to one or more dependency statements, and wherein the dependencies graph spans multiple physical machines,
wherein navigating the dependencies relationship rules comprises using a graph navigation mechanism adapted for navigating the dependencies graph and using a plurality of state machine navigation mechanisms, each of the plurality of state machine navigation mechanisms being adapted for navigating the corresponding state machine associated with one of the plurality of software applications, and
wherein the graph navigation mechanism and the plurality of state machine navigation mechanisms each comprise a plurality of restarters related in a hierarchical manner, wherein each of the restarters is adapted for restarting one of the plurality of software applications in accordance with the corresponding state machine.

12. The method as recited in claim 11, wherein each dependency node further represents the corresponding state machine associated with the software application.

13. The method as recited in claim 1, wherein each of the set of dependencies relationship rules indicates a nature of the relationship between one of the set of software applications and the first software application.

14. A method for representing application dependencies, comprising:
executing a first software application according to an associate state machine;
obtaining a set of dependencies relationship rules, the set of dependencies relationship rules indicating dependencies of a set of software applications upon the first software application based upon the state of the first software application; and
restarting one or more of the set of software applications in accordance with the set of dependencies relationship rules indicating dependencies of the set of software applications upon the first software application based upon the state of the first software application using a plurality of restarters related in a hierarchical manner, wherein each of the restarters is adapted for restarting one of the set of software applications in accordance with the corresponding state machine,
wherein the set of dependencies relationship rules is represented by a dependencies graph, wherein the first software application and each of the set of software applications is represented by a dependency node in the dependencies graph and each line connecting the dependency node representing the first application with dependency nodes representing one of the set of software applications corresponds to one or more dependency statements, and wherein the dependencies graph spans multiple physical machines.

15. The method as recited in claim 14, wherein each of the set of software applications is implemented on a different web server.

16. The method as recited in claim 14, wherein each of the set of dependencies relationship rules indicates a dependency of one of the set of software applications on the state of the first software application.

17. The method as recited in claim 14, further comprising:
detecting a change in state of the first software application using the associated state machine.

18. The method as recited in claim 14, wherein each dependency node further represents the state machine associated with the software application.

19. The method as recited in claim 14, wherein obtaining a set of dependencies relationship rules and restarting one or more of the set of software applications comprises:
navigating the dependencies graph such that the one or more of the set of software applications are restarted in accordance with the corresponding dependency statements.

20. The system as recited in claim 19, further comprising:
maintaining state information associated with the dependencies graph and the state machines associated with the set of software applications.

21. The method as recited in claim 19, wherein each of the dependency statements indicates a dependency of one of the set of software applications on the state of the first application.

22. The method as recited in claim 14, wherein each of the dependency statements indicates a dependency of one of the set of software applications on the state of the first application.

23. The method as recited in claim 14, further comprising:
   detecting a change in state of the first application; and
   restarting one or more of the set of software applications represented by one or more dependency nodes in the dependencies graph in accordance with the corresponding one or more dependency statements.

24. The method as recited in claim 23, wherein the corresponding one or more dependency statements indicates an order in which the one or more of the set of software applications are to be restarted, wherein restarting comprises:
   restarting the one or more of the set of software applications in the order specified by the one or more dependency statements.

25. The method as recited in claim 23, wherein the corresponding one or more dependency statements indicates that restarting the one or more of the set of software applications is to be performed upon detection of a failure of the first application.

26. The method as recited in claim 23, wherein the corresponding one or more dependency statements indicates that restarting the one or more of the set of software applications is to be performed upon detection of a restart of the first application.

27. The method as recited in claim 23, wherein the corresponding one or more dependency statements indicates that restarting the one or more of the set of software applications is to be performed upon detection of a reconfiguration of the first application.

28. The method as recited in claim 14, wherein one of the set of dependencies rules indicates that one of the set of software applications does not need to be restarted upon failure of the first software application.

29. The method as recited in claim 14, wherein one of the set of dependencies rules indicates that one of the set of software applications only needs the first software application in order to initiate execution of the one of the set of software applications.

30. The method as recited in claim 23, wherein detecting and restarting are performed by a mechanism for navigating the dependencies graph.

31. The method as recited in claim 19, further comprising:
   navigating the dependencies graph such that the set of software applications are restarted in accordance with corresponding dependency statements, the set of software applications being represented by nodes in the dependencies graph and the corresponding dependency statements being represented by lines connecting the nodes.

32. A system for representing application dependencies, comprising:
   a plurality of software applications executing on a processor, each of the software applications having an associated state machine defining a plurality of states and transitions among the plurality of states;
   a set of dependencies relationship rules indicating dependencies among the plurality of software applications based upon the state of the plurality of software applications; and
   a mechanism for navigating the set of dependencies relationship rules associated with the plurality of software applications,
   wherein the set of dependencies relationship rules are represented by a dependencies graph, wherein each of the plurality of software applications is represented by a dependency node in the dependencies graph and each line connecting two of the plurality of software applications corresponds to one or more dependency statements, and wherein the dependencies graph spans multiple physical machines,
   wherein the mechanism for navigating the dependencies graph comprises using a graph navigation mechanism adapted for navigating the dependencies graph, and using a plurality of state machine navigation mechanisms, each of the plurality of state machine navigation mechanisms being adapted for navigating the corresponding state machine associated with one of the plurality of software applications, and
   wherein the graph navigation mechanism and the plurality of state machine navigation mechanisms each comprise a plurality of restarters related in a hierarchical manner, wherein each of the restarters is adapted for restarting one of the plurality of software applications in accordance with the corresponding state machine.

33. The system as recited in claim 32, wherein each of the plurality of software applications is implemented on a web server.

34. The system as recited in claim 32, wherein each of the dependencies relationship rules indicates a dependency of one of the plurality of software applications on the state of one or more of the plurality of software applications.

35. The system as recited in claim 32, further comprising:
   a mechanism for detecting a change in state within a state machine associated with one or more of the plurality of software applications.

36. The system as recited in claim 32, further comprising:
   a mechanism for initiating a change in state in one or more of the plurality of applications.

37. The system as recited in claim 32, wherein the dependencies graph further represents the state machine associated with each dependency node.

38. The system as recited in claim 32, further comprising:
   one or more restarters for restarting one or more of the plurality of software applications in accordance with the corresponding one or more dependency statements.

39. The system as recited in claim 38, wherein the corresponding one or more dependency statements indicates an order in which the one or more of the plurality of software applications are to be restarted.

40. The system as recited in claim 38, wherein the restarters and the mechanism for navigating the set of dependencies relationship rules together maintain state information associated with the dependencies graph and the state machines associated with the plurality of software applications.

41. The system as recited in claim 32, wherein a state change of one of the software applications causes a state change in one or more of the plurality of software applications represented by one or more of the dependency nodes in the dependencies graph.

42. The system as recited in claim 41, wherein one or more of the set of dependencies relationship rules indicates an order in which the state change is to be initiated in the set of the software applications represented by the dependency nodes.

43. The system as recited in claim 41, wherein the state change is initiated corresponding to one or more of the dependency statements.

44. The system as recited in claim 43, wherein the mechanism for navigating the dependencies graph is a restarter adapted for restarting a software application in accordance with the corresponding one or more dependency statements.

45. The system as recited in claim 32, wherein each of the dependency statements indicates a dependency relationship between two of the dependency nodes.

46. The system as recited in claim 45, wherein each of the dependency statements indicates a dependency relationship between two of the dependency nodes, the dependency relationship indicating a dependency of a first one of the two dependency nodes on the state of a second one of the two dependency nodes.

47. The system as recited in claim 45, wherein the dependency relationship indicates whether a first one of the plurality of software applications associated with one of the two or more dependency nodes is to be restarted upon failure of a second one of the plurality of software applications associated with a second one of the two or more dependency nodes.

48. The system as recited in claim 47, wherein the dependency relationship indicates that the first software application needs to be restarted upon failure of the second software application.

49. The system as recited in claim 47, wherein the dependency relationship indicates that the first software application does not need to be restarted upon failure of the second software application.

50. The system as recited in claim 47, wherein the dependency relationship indicates that the first software application needs to be restarted upon restart of the second software application.

51. The system as recited in claim 47, wherein the dependency relationship indicates that the first software application needs to be restarted upon reconfiguration of the second software application.

52. The system as recited in claim 47, wherein the dependency relationship indicates that the first software application only needs the second application to start the first application.

53. The system as recited in claim 38, wherein each of the dependency statements indicates whether a first one of the plurality of software applications associated with a first one of two or more of the dependency nodes is to be restarted upon failure of a second one of the plurality of software applications associated with a second one of the two or more dependency nodes.

54. The system as recited in claim 53, wherein one of the dependency statements indicates that the restarter needs to restart the first application upon failure of the second application.

55. The system as recited in claim 53, wherein one of the dependency statements indicates that the restarter does not need to restart the first application upon failure of the second one of the dependency nodes.

56. The system as recited in claim 53, wherein one of the dependency statements indicates that the restarter needs to restart the first application upon restart of the second application.

57. The system as recited in claim 53, wherein one of the dependency statements indicates that the restarter needs to restart the first application upon reconfiguration of the second application.

58. The system as recited in claim 32, wherein each of the dependencies relationship rules indicates a degree of dependency of one of the plurality of software applications on another one of the software applications.

59. A computer-readable medium storing thereon computer-readable instructions for representing application dependencies, comprising:
    instructions for executing a first software application according to an associated state machine;
    instructions for obtaining a set of dependencies relationship rules, the set of dependencies relationship rules indicating dependencies of a set of software applications upon the first software application based upon the state of the first software application; and
    instructions for navigating the set of dependencies relationship rules indicating dependencies of the set of software applications upon the first software application based upon the state of the first software application,
    wherein the set of dependencies relationship rules are represented by a dependencies graph, wherein the first software application and each of the set of software applications is represented by a dependency node in the dependencies graph and each line connecting two of the plurality of software applications corresponds to one or more dependency statements, and wherein the dependencies graph spans multiple physical machines,
    wherein navigating the set of dependencies relationship rules comprises using a graph navigation mechanism adapted for navigating the dependencies graph, and using a plurality of state machine navigation mechanisms, each of the plurality of state machine navigation mechanisms being adapted for navigating the corresponding state machine associated with one of the set of software applications, and
    wherein the graph navigation mechanism and the plurality of state machine navigation mechanisms each comprise a plurality of restarters related in a hierarchical manner, wherein each of the restarters is adapted for restarting one of the set of software applications in accordance with the corresponding state machine.

\* \* \* \* \*